(12) United States Patent
Youn (10) Patent No.: US 8,730,849 B2
(45) Date of Patent: May 20, 2014

(54) METHOD FOR TRANSMITTING AND RECEIVING INFORMATION RELATED TO RELAY STATION

(75) Inventor: Ae Ran Youn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 12/999,275

(22) PCT Filed: Jun. 26, 2009

(86) PCT No.: PCT/KR2009/003475
§ 371 (c)(1),
(2), (4) Date: Mar. 11, 2011

(87) PCT Pub. No.: WO2010/002151
PCT Pub. Date: Jan. 7, 2010

(65) Prior Publication Data
US 2011/0176475 A1    Jul. 21, 2011

Related U.S. Application Data

(60) Provisional application No. 61/077,160, filed on Jun. 30, 2008, provisional application No. 61/092,414, filed on Aug. 28, 2008.

(30) Foreign Application Priority Data

Jul. 14, 2008   (KR) .................. 10-2008-0068207
Oct. 10, 2008   (KR) .................. 10-2008-0099672

(51) Int. Cl.
*H04B 7/14*    (2006.01)

(52) U.S. Cl.
USPC ........... 370/279; 370/277; 370/315; 370/327; 455/11.1

(58) Field of Classification Search
None
See application file for complete search history.

(56) References Cited

U.S. PATENT DOCUMENTS

| | | | |
|---|---|---|---|
| 2003/0125067 A1 | 7/2003 | Takeda et al. | |
| 2008/0049657 A1 | 2/2008 | Feng et al. | |
| 2008/0113616 A1 | 5/2008 | Kim et al. | |
| 2009/0167513 A1* | 7/2009 | Hill et al. ................ | 340/435 |
| 2011/0182253 A1* | 7/2011 | Shekalim ................ | 370/329 |
| 2011/0228742 A1* | 9/2011 | Honkasalo et al. ....... | 370/330 |
| 2011/0235602 A1* | 9/2011 | Ji et al. ................... | 370/329 |

* cited by examiner

*Primary Examiner* — Donald Mills
(74) *Attorney, Agent, or Firm* — Birch, Stewart, Kolasch & Birch, LLP (57) ABSTRACT

A method of transmitting and receiving information related to a relay station is disclosed. The present invention includes the steps of periodically receiving hop information indicating whether a hop number from the relay station to a base station is odd via a superframe header and determining a timing point for the mobile station to switch to a receive mode according to the hop information. Accordingly, a mobile station is informed of a hop number between a base station and a multi-hop relay station, whereby a waste of power of the mobile station is minimized. And, resources can be efficiently usable.

8 Claims, 6 Drawing Sheets

METHOD FOR TRANSMITTING AND RECEIVING INFORMATION RELATED TO RELAY STATION

This application is the National Phase of PCT/KR2009/003475 filed on Jun. 26, 2009, which claims priority under 35 U.S.C. 119(e) to U.S. Provisional Application No. 61/077,160 filed on Jun. 30, 2008, 61/092,414 filed on Aug. 28, 2008 and under 35 U.S.C. 119(a) to Patent Application No. 10-2008-0068207 filed in the Republic of Korea on Jul. 14, 2008, 10-2008-0099672 filed on Oct. 10, 2008 all of which are hereby expressly incorporated by reference into the present application.

TECHNICAL FIELD

The present invention relates to a mobile communication system including a relay station capable of recognizing a terminal, and more particularly, to a method of transmitting information on a relay station to a subordinate relay station or a mobile terminal to perform a communication between a base station and a terminal via a relay station.

BACKGROUND ART

Generally, a relay station (hereinafter abbreviated RS) is proposed for the purpose of cell coverage extension and throughput increase of a mobile communication system. IEEE 802.16e/16m terminal is supported for the relay station. And, this relay station is an active repeater including network entry, mobility, RRM and security functions of a PMP based relay station partially provided with functions of a base station. The relay station decodes a signal received from a transmitting end, re-encodes the decoded signal, and then delivers the re-encoded signal to a receiving end. Therefore, the relay station is able to play a role as a digital amplifier capable of obtaining high performance using noise removal and higher data rate coding. Yet, it is disadvantageous in that the communication via the relay station may generate a delay in the process of decoding and encoding. Moreover, a problem of backward compatibility of PMP mode should be taken into consideration for the communication via the relay station.

A type of a relay station can be categorized in the following manner. First of all, a fixed relay station (RS) is permanently fixed and used for a shade area or a cell coverage increase. This type is usable for a simple repeater. Secondly, a nomadic relay station (RS) is the relay station that can be temporarily installed if the number of users is abruptly incremented. And, the nomadic relay station is the relay station that can be arbitrarily moved within a building. Thirdly, a mobile relay station (RS) is the relay station that can be attached to a public transportation such as a bus, a subway and the like.

Figure 1:
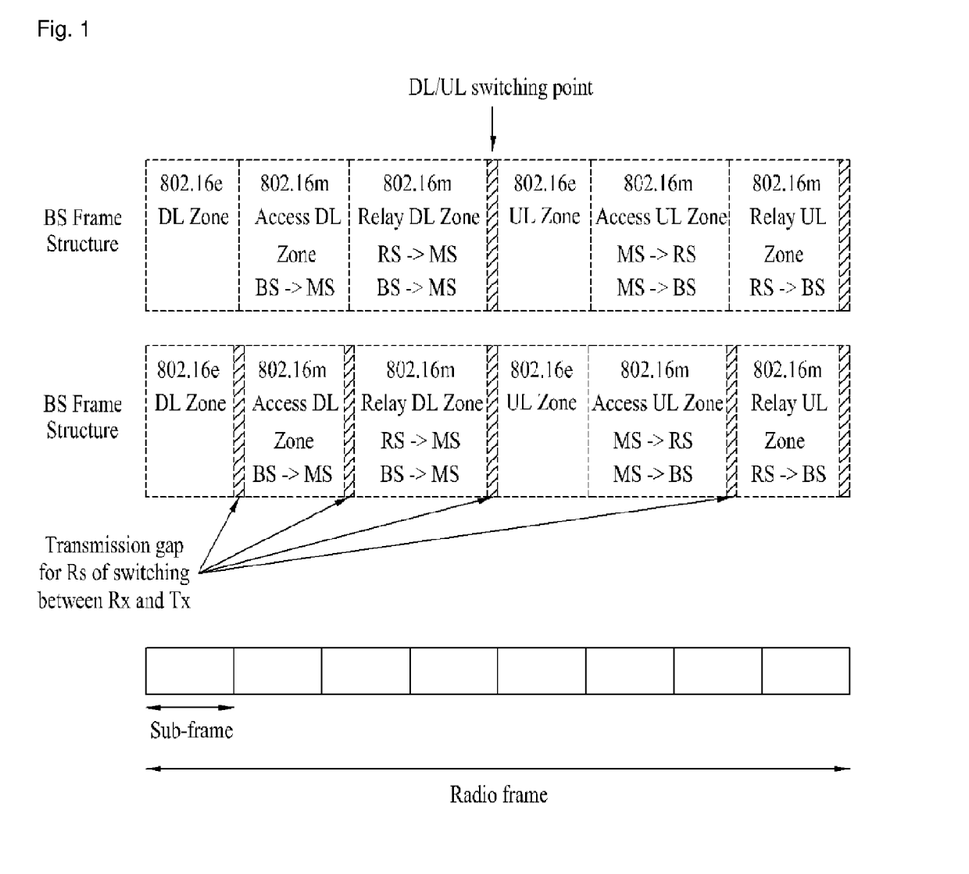
FIG. 1 is a diagram of a frame structure for supporting a relay station in a broadband wireless access system according to a related art.

FIG. 1 is a diagram of a frame structure for supporting a relay station in a broadband wireless access system according to a related art.

A frame structure shown in FIG. 1 assumes a case that there are two hops between a base station and a relay station. A downlink relay zone (Relay DL Zone) and an uplink relay zone (Relay UL Zone) of a relay station are established within a frame. Data transmitted to a relay station by a base station is allocated as a burst in a downlink of a frame. And, data transmitted to a mobile terminal or an adjacent relay station by a relay station is allocated to a downlink zone of the relay station.

If there is data to be transmitted to a relay station by a mobile terminal or an adjacent relay station, the data is transmitted via a zone allocated to an adjacent relay station or each terminal in an uplink zone of the relay station. The relay station receives the data in the zone allocated to the corresponding relay station in uplink.

Figure 2:
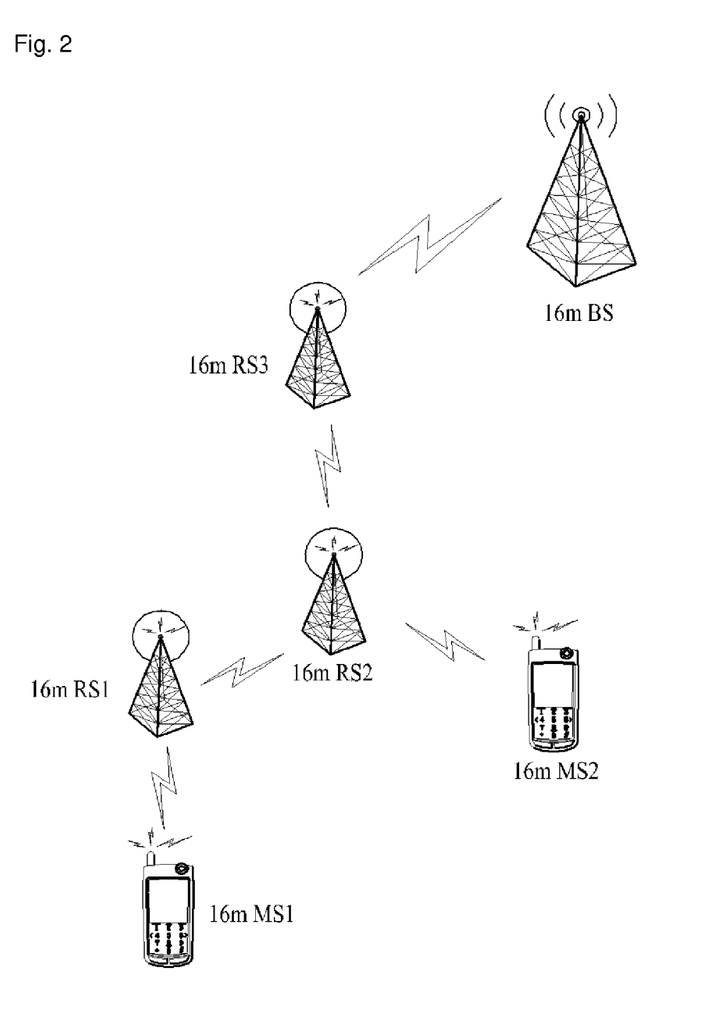
FIG. 2 is a diagram for an example of a multi-hop relay to which the present invention is applied.

FIG. 2 is a diagram for an example of a multi-hop relay to which the present invention is applied.

In a mobile communication system according to a related art, when communication is performed between a base station and a mobile terminal via several relay stations, an interval for a subordinate relay station (RS) or a terminal to receive/transmit data is differently determined according to whether a hop between the base station and the relay station corresponds to an order of an odd number (2n+1, where n is a zero or natural number) or an order of an even number (2n+2). In particular, if a mobile station MS1 receives data from an odd ordered relay station RS1, data is allocated to a downlink access zone. And, another mobile station MS2 in the course of communication with an even ordered relay station RS2 receives data via a downlink relay zone.

Figure 3:
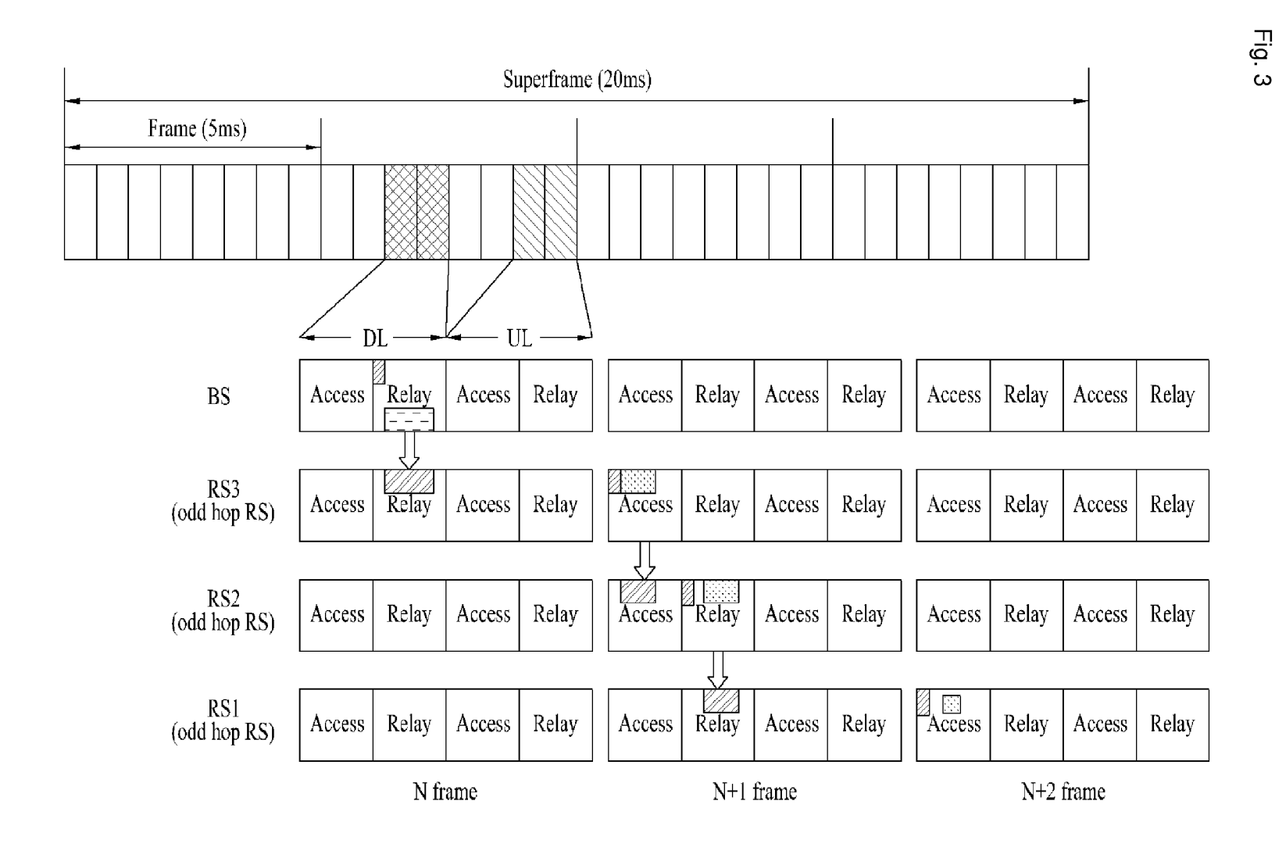
FIG. 3 is a diagram for a case that a mobile station receives data via relay stations to communicate with a service base station.

FIG. 3 is a diagram for a case that a mobile station receives data via relay stations RS3, RS2 and RS1 to communicate with a serving base station (SBS).

Referring to FIG. 3, in case of a mobile station MS1 receiving data from an odd ordered relay station RS1, it receives data via a downlink access zone of the relay station RS1. In FIG. 3, another mobile station MS2 in the course of communication with an even ordered relay station RS2 receives data via a downlink relay zone of the relay station RS2.

A base station transmits data to a third relay station RS3 via a relay zone. The third relay station RS3 having received the data transmits the corresponding data to the second relay station RS2 via a next frame access zone. The second relay station RS2 receives the data via the access zone and then transmits the corresponding data to the mobile station (e.g., MS2) or the first relay station RS1 via a relay zone of a next subframe. If the first relay station RS1 is further included to the path between the base station and the mobile station (e.g., MS1), the first relay station RS1 receives the data from a relay zone of the second relay station RS2 and then transmits the data to the mobile station via an access zone of a next frame.

DISCLOSURE OF INVENTION

Technical Problem

However, if a mobile station tries a communication with a base station via a relay station in an initial network entry or if a mobile station tries a handover into a relay station having an unequal hop number, and more particularly, the mobile station performs a handover into an even-hop relay station from an odd-hop relay station or a handover into an odd-hop relay station from an even-hop relay station, a procedure for the mobile station to recognize hop information of the corresponding relay station has not been defined.

Accordingly, in an interval where a relay station receives data from a superordinate relay station, a mobile station operates in a receiving mode to waste its power and resources. Moreover, in case of a subordinate relay station receiving data from another relay station, the same problem of the mobile station is caused.

Accordingly, the present invention is directed to a method for transmitting and receiving information related to a relay station that substantially obviates one or more of the problems due to limitations and disadvantages of the related art.

An object of the present invention is to provide a method of receiving relay station information, by which power waste of a mobile station is minimized and by which resources of the mobile station are efficiently usable.

Another object of the present invention is to provide a method of transmitting relay station information, by which power waste of a mobile station is minimized and by which resources of the mobile station are efficiently usable.

It will be appreciated by persons skilled in the art that the present invention is not limited to what has been particularly described hereinabove. Other technical problems that are not described herein will be apparent from the following description to persons skilled in the art.

Technical Solution

To achieve these and other advantages and in accordance with the purpose of the present invention, as embodied and broadly described, a method of receiving relay station information according to one embodiment of the present invention includes the steps of periodically receiving hop information indicating whether a hop number from a service relay station to a base station is odd via a superframe header of the base station or the relay station and determining a timing point for the mobile station to switch to a receive mode according to the hop information.

Preferably, the hop information is carried on at least one selected from the group consisting of a primary broadcast channel (PBCH) of the superframe header and a secondary broadcast channel (SBCH) thereof.

To further achieve these and other advantages and in accordance with the purpose of the present invention, a method of receiving relay station information according to another embodiment of the present invention includes the steps of transmitting a message for requesting information on a specific relay station to a serving relay station from the mobile station and receiving hop information indicating whether a hop number from the specific relay station to a base station is odd from the serving relay station via a response message.

Preferably, the response message can include a handover response message for a handover request into the specific relay station.

Preferably, the method further includes the step of determining a timing point for the mobile station to switch to a receive mode according to the hop information.

To further achieve these and other advantages and in accordance with the purpose of the present invention, a method of receiving relay station information according to a further embodiment of the present invention includes the steps of receiving hop information indicating start positions of a downlink receive interval and an uplink receive interval corresponding to a hop number from a relay station to a base station and determining a timing point for the mobile station to switch to a receive mode according to the hop information.

Preferably, in the hop number calculating step, if a request for information on the relay station is received from the mobile station, it is able to calculate the hop number from the relay station to the base station.

To further achieve these and other advantages and in accordance with the purpose of the present invention, a method of receiving relay station information according to one embodiment of the present invention includes the steps of calculating a hop number from the relay station to a base station and periodically transmitting hop information indicating whether the calculated hop number is odd to the mobile station via a superframe header or transmitting the hop information often each time the hop number is changed.

Preferably, the hop information is carried on at least one selected from the group consisting of a primary broadcast channel (PBCH) of the superframe header and a secondary broadcast channel (SBCH) thereof.

To further achieve these and other advantages and in accordance with the purpose of the present invention, a method of transmitting relay station information according to another embodiment of the present invention includes the steps of if a message for requesting information on a specific relay station is received from a mobile station, calculating a hop number from the specific relay station to a base station and transmitting hop information indicating whether the calculated hop number is odd to the mobile station via a response message.

Preferably, the response message can include a handover response message for a handover request into the specific relay station.

To further achieve these and other advantages and in accordance with the purpose of the present invention, a method of transmitting relay station information according to a further embodiment of the present invention includes the steps of calculating a hop number from a relay station to a base station and transmitting hop information indicating start positions of a downlink receive interval and an uplink receive interval corresponding to the calculated hop number to the mobile station.

Preferably, in the hop number calculating step, if a message for requesting information on a specific relay station is received from the mobile station, the hop number from the specific relay station to the base station can be calculated.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, a subordinate relay station or a mobile station is informed of a hop number between a base station and a multi-hop relay station and/or frame structure information. Therefore, a waste of power of the mobile station or the relay station is minimized. And, resources of the mobile station or the relay station are efficiently usable.

It will be appreciated by persons skilled in the art that the present invention is not limited to what has been particularly described hereinabove. Other effects that are not described herein will be apparent from the following description to persons skilled in the art.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings.

The present invention relates to a wireless access system. In this following description, methods of transmitting/receiving relay station information more efficiently are explained.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'mobile station (MS)' can be replaced by such a terminology as a user equipment (UE), a subscriber station (SS), a mobile subscriber station (MSS)', a mobile terminal, a terminal and the like.

Moreover, a transmitting side means a fixed and/or mobile node that provides a data service or a speech service. And, a receiving side means a fixed and/or mobile node that receives a data service or a speech service. Hence, a mobile station can become a transmitting side and a base station can become a receiving side, in uplink. Likewise, a mobile station becomes a receiving side and a base station can become a transmitting side, in downlink.

Meanwhile, in the present invention, a mobile station can include one of a personal digital assistant (PDA), a cellular phone, a personal communication service (PCS) phone, a GSM (global system for mobile) phone, a WCDMA (wideband CDMA) phone, an MBS (mobile broadband system) phone and the like. Moreover, a mobile station can include one of a personal digital assistant (PDA), a hand-held PC, a notebook PC, a smart phone, a MM-MB (multimode-multiband) terminal and the like.

In this case, the smart phone is a terminal provided with advantages of a mobile communication terminal and a PDA. The smart phone may mean a terminal in which a schedule management function of a PDA, data communication functions of fax transmission/reception, internet access, etc. are integrated on a mobile communication terminal. And, a multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means open to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in the disclosure can be supported by at least one of P802.16-2004, P802.16e-2005 and P802.16Rev2 documents which are the standards of IEEE 802.16 system.

In the following description, specific terminologies are provided to help the understanding of the present invention. And, the use of the specific terminology can be modified into another form within the scope of the technical idea of the present invention.

Figure 4:
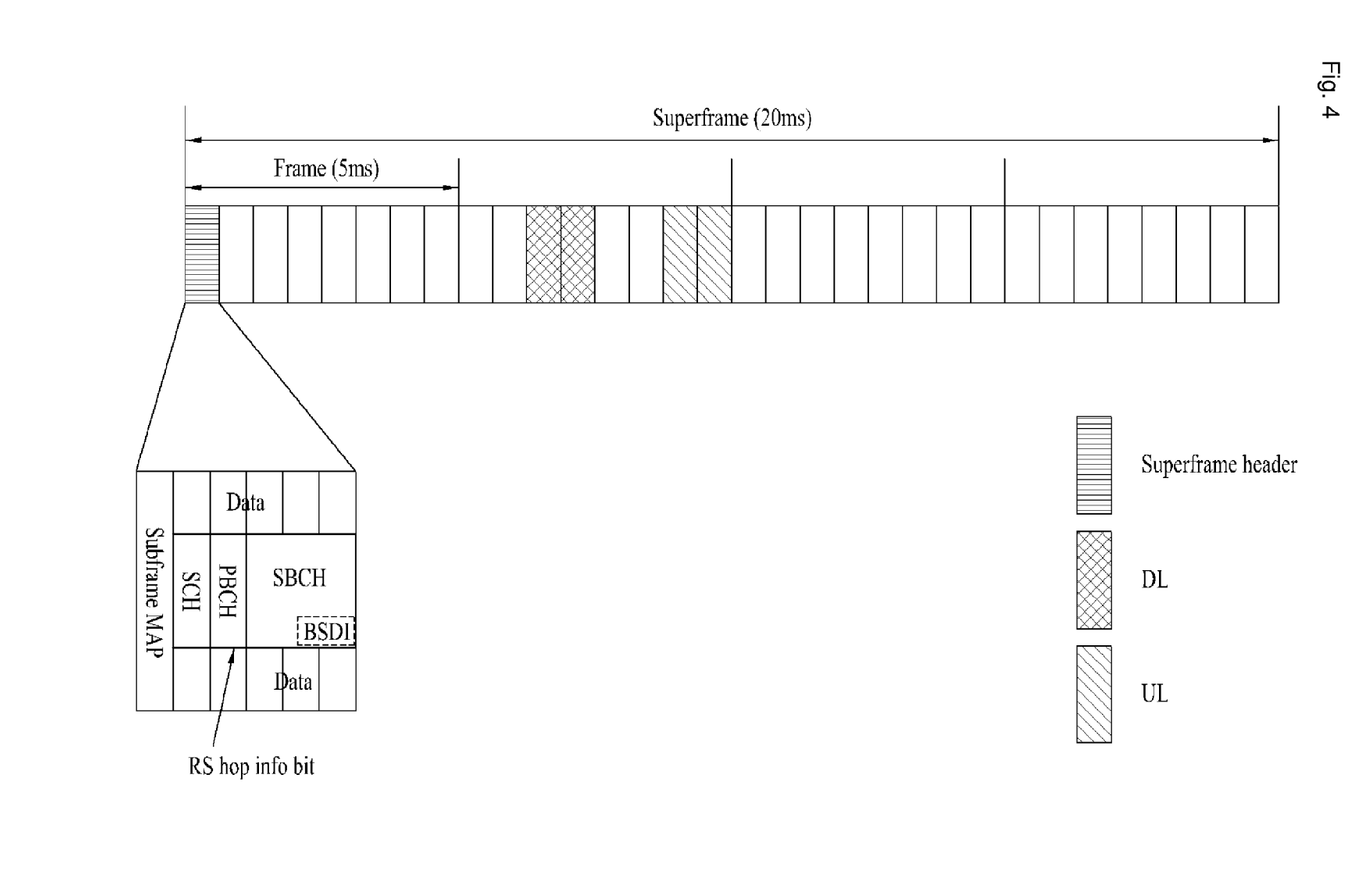
FIG. 4 is a diagram for an example of a superframe header in a relay station information transmitting method according to one embodiment of the present invention.

FIG. 4 is a diagram for an example of a superframe header in a relay station information transmitting method according to one embodiment of the present invention.

According to one embodiment of the present invention, an identifier for transmitting hop information between a base station and a relay station to a mobile station is defined.

According to one embodiment of the present invention, hop information indicating whether a hop number of a specific relay station is an odd number or an even number is periodically transmitted via a superframe header. The hop information can be broadcasted by a base station or a relay station. The hop information can be calculated by a base station or each relay station. If the hop information is not frequently changed, it can be transmitted via a primary broadcast channel. If the hop information is frequently changed, it can be transmitted via a secondary broadcast channel.

The hop information can be constructed with a relay station hop information bit (RS hop info bit). If a hop number between a base station and a relay station is even, the hop information bit can have a value of zero. If a hop number between a base station and a relay station is odd, the hop information bit can have a value of 1.

For instance, if a hop number from a base station to a corresponding relay station is even, a downlink access zone, downlink relay zone, uplink access zone and uplink relay zone of the relay station correspond to a receive mode, a transmit mode, a transmit mode and a receive mode, respectively. If a hop number from a base station to a corresponding relay station is odd, a downlink access zone, downlink relay zone, uplink access zone and uplink relay zone of the relay station correspond to a transmit mode, a receive mode, a receive mode and a transmit mode, respectively.

According to one embodiment of the present invention, a relay station or a base station calculates a hop number from the relay station to the base station. A mobile station or a relay station periodically receives hop information indicating whether a hop number from the relay station to a base station is odd via a superframe header. Subsequently, the mobile station determined whether to switch to a receive mode at a specific timing point according to the received hop information. A mobile station unable to receive a signal of a base station is able to receive the hop information from a relay station. And, a relay station unable to receive a signal of a base station is able to receive the hop information from a superordinate relay station.

Figure 5:
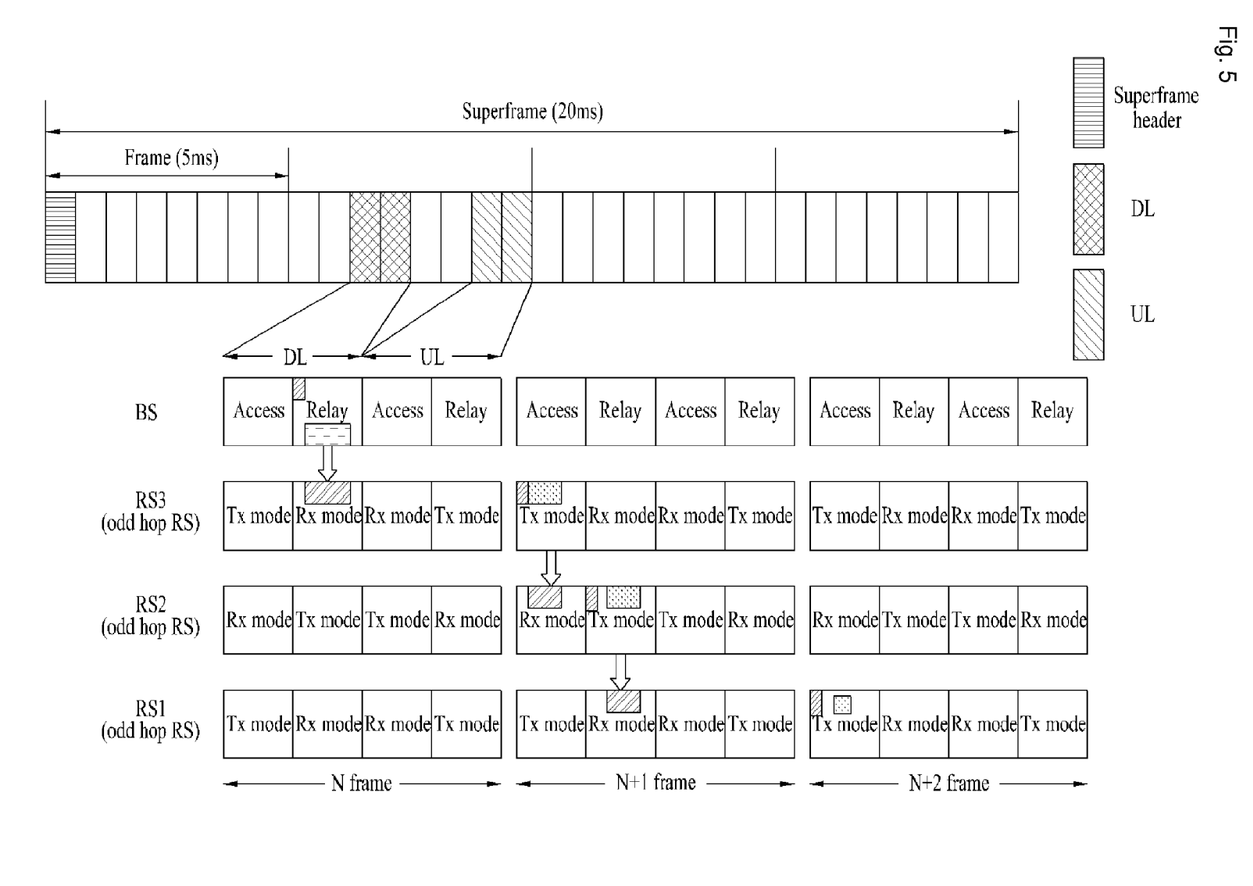
FIG. 5 is a diagram for a data transmission between relay stations shown in FIG. 4.

FIG. 5 is a diagram for a data transmission between relay stations shown in FIG. 4.

In FIG. 5, odd hop relay stations RS3 and RS1 operate in order of a transmit mode, a receive mode, a receive mode and a transmit mode. And, an even hop relay station RS2 operates in order of a receive mode, a transmit mode, a transmit mode and a receive mode. A mobile station receives hop information from a specific relay station or a base station and is then able to receive data in a transmit mode of a relay station the mobile station attempts to communicate with.

A serving base station or a relay station periodically broadcasts hop information via a MAC message. Alternatively, a serving base station or a relay station is able to transmit changed hop information only if hop information is changed.

According to another embodiment of the present invention, a mobile station or a relay station is able to make a request for hop information of an adjacent relay station due to a reason for attempting a handover or the like. In case that a mobile station or a relay station tries a handover into an adjacent relay station, a base station or a service relay station is able to inform the mobile station or the relay station of hop information indicating whether a hop number of a destination relay station is even or odd via a handover (HO) response.

According to another embodiment of the present invention, a mobile station transmits a message for requesting information of a specific relay station to a relay station or a serving base station. The relay station or the serving base station calculates a hop number from a specific relay station to the base station and then generates information indicating whether a calculated hop number is odd. The relay station or the serving base station transmits the hop information to the mobile station via a response message.

As mentioned in the foregoing description, the hop information included in the handover response can include a hop information bit. For instance, if a hop number between a base station and a relay station is even, the hop information bit can have a value of zero. If a hop number between a base station and a relay station is odd, the hop information bit can have a value of 1. For instance, if a hop number from a base station to a corresponding relay station is even, a downlink access zone, downlink relay zone, uplink access zone and uplink relay zone of the relay station correspond to a receive mode, a transmit mode, a transmit mode and a receive mode, respectively. If a hop number from a base station to a corresponding relay station is odd, a downlink access zone, downlink relay zone, uplink access zone and uplink relay zone of the relay station correspond to a transmit mode, a receive mode, a receive mode and a transmit mode, respectively. A terminal, which needs hop information between a base station and a relay station, includes a mobile terminal having a service from the relay station, a mobile relay station, a nomadic relay station, a fixed relay station or the like.

The above described correlation between the hop information and the transmit/receive mode is just exemplary, by which the scope of the technical spirit of the present invention is non-limited.

According to a further embodiment of the present invention, identifiers for announcing start positions of a downlink reception interval and an uplink transmission interval of a mobile station for a corresponding relay station are defined.

For examples of the identifiers, a relay station downlink (RS DL) transmit zone offset indicates downlink timing (or symbol) information from a frame start position and a relay station uplink (RS UL) receive zone offset indicates uplink timing (or symbol) information from a frame start position. For instance, downlink timing information and uplink timing information are constructed with 8 bits to announce a timing point for a mobile station to receive data from a corresponding relay station.

Figure 6:
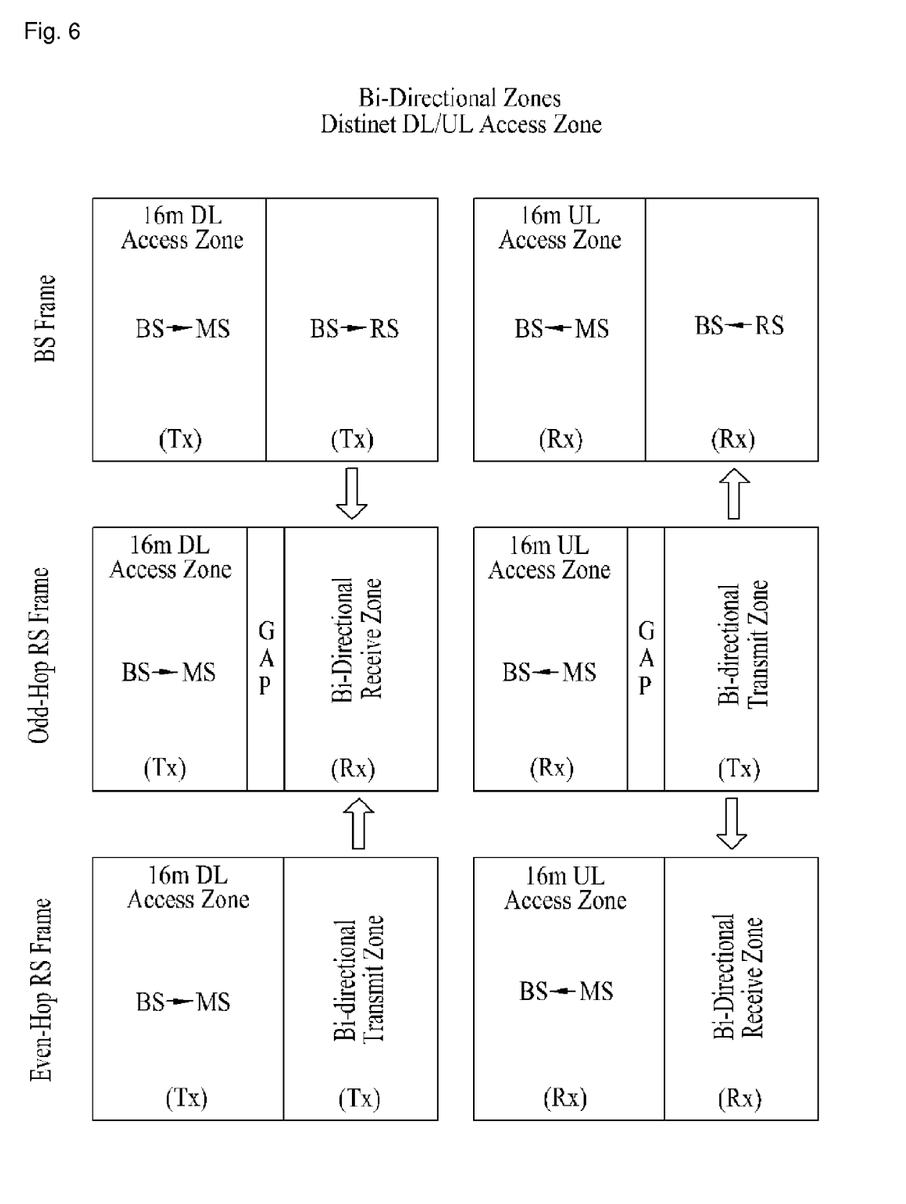
FIG. 6 is a diagram for data transmissions using bi-directional zones.

FIG. 6 is a diagram for data transmissions using bi-directional zones.

In a frame structure shown in FIG. 6, a receiving or transmitting interval of a relay station varies according to a hop number. In particular, in order to receive data from a base station or a superordinate relay station, an odd hop relay station receives the data via a downlink (DL) relay zone of the base station or a bi-directional receive zone after a 16m downlink (DL) access zone of the superordinate relay station. And, an even hop relay station receives the data via a bi-directional receive zone after a 16m uplink (UL) access zone of the superordinate relay station.

Even if the bi-directional zones shown in FIG. 6 are used, a serving base station or a relay station periodically transmits hop information according to one embodiment of the present invention or is able to transmit hop information by an event trigger method according to another embodiment of the present invention.

In this case, if hop information is even (i.e., '0'), it indicates that a hop number from a base station to a relay station is even. Downlink (DL) access, downlink (DL) relay, uplink (UL) access and uplink (UL) relay zones of the relay station indicate a 16m downlink (DL) access zone, a bi-directional transmit zone, a 16m uplink (UL) access zone and a bi-directional receive zone in FIG. 6, respectively. If hop information is odd (i.e., '1'), it indicates that a hop number from a base station to a corresponding relay station is odd. Downlink (DL) access, downlink (DL) relay, uplink (UL) access and uplink (UL) relay zones of the relay station indicate a 16m downlink (DL) access zone, a bi-directional receive zone, a 16m uplink (UL) access zone and a bi-directional transmit zone in FIG. 6, respectively.

Meanwhile, in case that neighbor relay stations (RSs) list information (info) is periodically transmitted, it is able to represent relay station hop information bit (RS hop info bit) together with an identifier of each relay station.

In case of the unidirectional zones shown in FIG. 5, a base station or a relay station transmits an identifier for announcing start positions of a downlink receive interval and an uplink transmit interval from a corresponding relay station to a mobile station. For examples of the identifier, a relay station downlink (RS DL) transmit zone offset indicates a downlink timing (or symbol) from a frame start position and a relay station uplink (RS UL) receive zone offset indicates an uplink timing (or symbol) from a frame start position.

In case of the bi-directional zones in FIG. 6, a superordinate relay station transmits identifiers for announcing a transmit zone and a receive zone to a subordinate relay station. For examples of these identifiers, a bi-directional transmit zone offset indicates a downlink (DL) timing (symbol) from a frame start position. And, a bi-directional receive zone offset indicates an uplink (UL) timing (symbol) from a frame start position.

An indicator indicating whether a frame structure of a relay station is the uni-directional zone shown in FIG. 5 or a bi-directional zone shown in FIG. 6 and information on a hop number can be transmitted to a mobile station or a subordinate relay station via a broadcast channel or a MAC message. In case that relay station frame information (RS frame info) including the indicator is constructed with two bits, four kinds of cases can be represented as follows.

00: uni-directional zones, even hop
01: uni-directional zones, odd hop
10: bi-directional zones, even hop
11: bi-directional zones, odd hop The above-described relay station downlink transmit zone offset, relay station uplink receive zone offset, bi-directional transmit zone offset, bi-directional receive zone offset, indicator indicating a unidirectional zone, a bi-directional zone, relay station frame information or the like can be periodically reported via a broadcast channel or can be reported by an event triggered method via a MAC message.

INDUSTRIAL APPLICABILITY

Accordingly, the present invention relates to a method of transmitting relay station information to a mobile station to enable a base station and a mobile station to communicate with each other via a relay station in a mobile communication system including the relay station capable of recognizing the mobile station. And, the present invention is applicable to a base station, a relay station, a terminal and the like in IEEE 802.16m system and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of receiving information on a relay station in a mobile communication system including a plurality of relay stations capable of recognizing a mobile station, the method comprising:

receiving hop information having one bit length and indicating whether a hop number from the relay station to a base station is odd via a superframe header; and determining a timing point for the mobile station to switch from a transmit mode to a receive mode in a time divisional duplex (TDD) scheme according to the hop information, wherein a time period during which a first relay station, whose hop number is odd, operates in the transmit mode corresponds to a time period during which a second relay station, whose hop number is even, operates in the receive mode.

2. The method according to claim 1, wherein the hop information is carried on at least one selected from the group consisting of a primary broadcast channel (PBCH) of the superframe header and a secondary broadcast channel (SBCH) thereof.

3. The method according to claim 1, further comprising:

transmitting a message for requesting information on a specific relay station to a serving relay station from the mobile station; and wherein the hop information indicates whether a hop number from the specific relay station to the base station is odd, and is received from the serving relay station via a response message.

4. The method according to claim 3, wherein the response message comprises either a handover response message for a handover request into the specific relay station or the response message for a hop information request of an adjacent relay station.

5. A method of transmitting information on a relay station in a mobile communication system including a plurality of relay stations capable of recognizing a mobile station, the method comprising:

calculating a hop number from the relay station to a base station; and transmitting hop information having one bit length and indicating whether the calculated hop number is odd to the mobile station, wherein the hop information is used for determining a timing point for the mobile station to switch from a transmit mode to a receive mode in a time divisional duplex (TDD) scheme, wherein a time period during which a first relay station, whose hop number is odd, operates in the transmit mode corresponds to a time period during which a second relay station, whose hop number is even, operates in the receive mode.

6. The method according to claim 5, wherein the hop number calculating step is performed if a message for requesting the information on the relay station is received from the mobile station.

7. The method according to claim 5, wherein the hop information is periodically transmitted.

8. The method according to claim 7, wherein the hop information is carried on at least one selected from the group consisting of a primary broadcast channel (PBCH) of the superframe header and a secondary broadcast channel (SBCH) thereof.

* * * * *